(12) United States Patent
Polehonki et al.

(10) Patent No.: US 7,727,022 B2
(45) Date of Patent: Jun. 1, 2010

(54) ON HARNESS PCB ELECTRICAL CENTER

(75) Inventors: Ralph John Polehonki, El Paso, TX (US); Andrew Joseph Jozwiak, El Paso, TX (US); Erick A. Rodriguez, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/358,773

(22) Filed: Jan. 23, 2009

(65) Prior Publication Data

US 2009/0209117 A1 Aug. 20, 2009

Related U.S. Application Data

(60) Provisional application No. 61/065,710, filed on Feb. 14, 2008.

(51) Int. Cl.
*H01R 13/68* (2006.01)
(52) U.S. Cl. .................. 439/620.27; 439/76.2
(58) Field of Classification Search ............ 439/620.27, 439/6.2, 76.1, 595
See application file for complete search history.

(56) References Cited

U.S. PATENT DOCUMENTS 5,715,135 A * 2/1998 Brussalis et al. ............ 361/624
6,126,457 A * 10/2000 Smith et al. ................. 439/76.2
7,249,956 B2 * 7/2007 Ishiguro et al. ............. 439/76.2

OTHER PUBLICATIONS

Power Distribution Block 135105.

* cited by examiner

*Primary Examiner*—Phuong K Dinh
(74) *Attorney, Agent, or Firm*—Thomas N. Twomey

(57) ABSTRACT

An electrical center is mounted on a wiring harness. The electrical center comprises an upper insulator housing having a plurality of upper terminal receiving cavities, a circuit board assembly disposed in the upper housing below the upper terminal receiving cavities, a plurality of terminals mounted on the circuit board contact portions above the circuit board disposed in the upper terminal receiving cavities for engaging mating terminals plugged into the upper terminal receiving cavities, and a lower insulator housing having a plurality of lower terminal receiving cavities. The terminals mounted on the circuit board have contact portions below the circuit board disposed in the lower terminal receiving cavities for engaging mating terminals that are attached to wires of the wiring harness and that are plugged in the lower terminal receiving cavities. The upper housing may be mated to the lower housing in a prestaged condition to facilitate loading of the mating terminals that are attached to the wires of the wiring harness. The housings are adapted for use with a press holder to move from the prestaged condition to the fully seated condition.

10 Claims, 7 Drawing Sheets

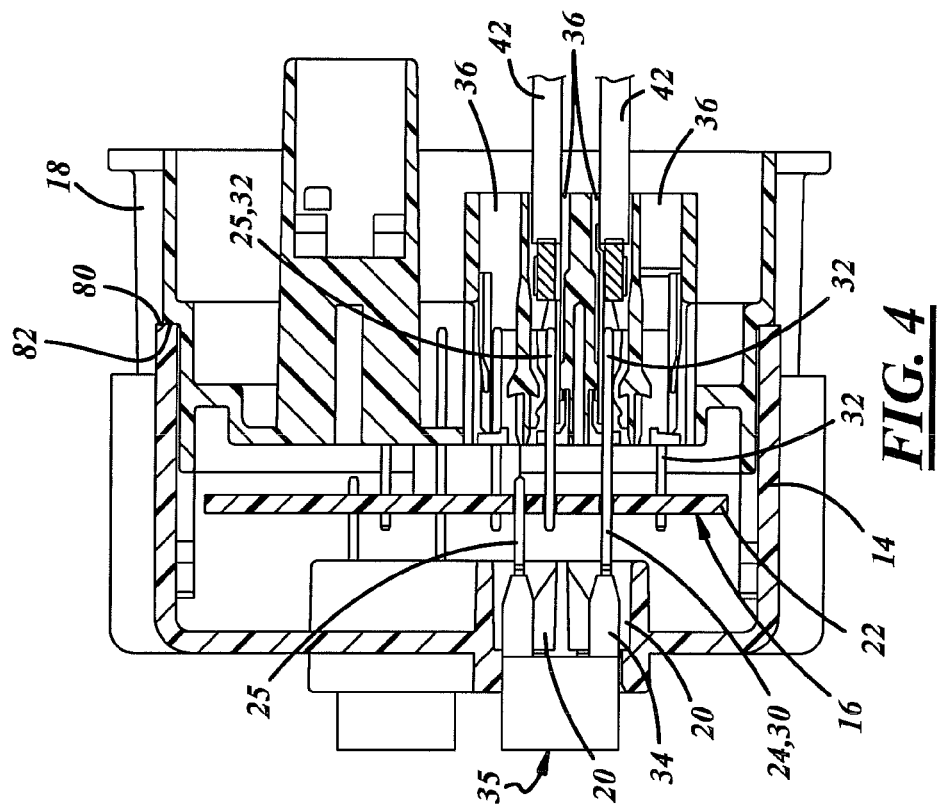
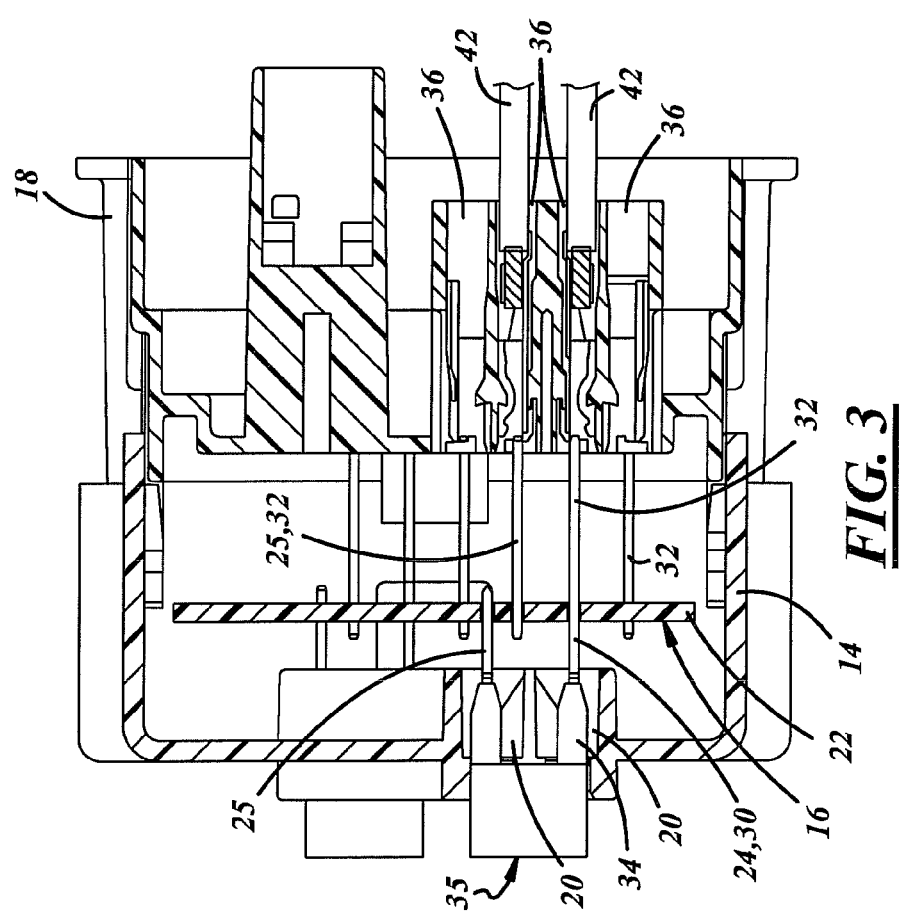

ON HARNESS PCB ELECTRICAL CENTER

CROSS REFERENCE TO RELATED APPLICATION

This application claims the benefit of Provisional Patent Application No. 61/065,710 filed Feb. 14, 2008, the disclosure of which is hereby incorporated by reference.

BACKGROUND OF THE INVENTION

This invention relates generally to an electrical center and more particularly to an electrical center that is associated with a wiring harness.

U.S. Pat. No. 6,062,916 granted to Joseph H. Gladd et al. May 16, 2000 discloses an electrical center 8 having a two-piece housing comprising an upper housing 10 and a lower housing 12. The electrical center 8 includes a circuit board 14 that is sandwiched between the upper housing 10 and the lower housing 12. The circuit board 14 carries a plurality of terminals 16, 16A, 16B, 16C and 16D of various configurations that have an upper terminal engagement feature 22, 22A, 22C etc. Terminals 16, 16A, 16B and 16C are two-way pass-through terminals that have a lower terminal engagement feature 24, 24B while terminal 16D is a one-way terminal that has only one engagement feature.

The upper housing 10 is designed to receive fuses and/or relays (not shown) that are plugged into the upper housing 10. The fuses and relays have terminals that engage upper terminals features 22, 22A, 22C etc. when such devices are plugged into the upper housing so that the fuses and relays are connected into various electrical circuits that are partially formed on the circuit board 14 as electrical traces in a well known manner. The lower housing 12 has a plurality of bays 17 for receiving plug-in connectors at the ends of various wiring harnesses (not shown).

The plug-in connectors of the wiring harnesses house terminals attached to the ends of the insulated wires of the wiring harnesses that engage the lower terminal engagement features 24 or 24B when the plug-in connectors of the wiring harnesses are plugged into the bays 17. Thus the insulated wires of the wiring harnesses form parts of the various electrical circuits that are partially formed by traces on the circuit board 14. For automotive vehicle applications, the two piece housing of the electrical center is customarily mounted on the body of the automotive vehicle and then the plug-in connectors of several wiring harnesses are plugged into the bays.

U.S. Pat. No. 6,891,463 granted to Yasutaka Nagaoka May 10, 2005 discloses another electrical center 1 having a two-piece housing 2 having a lower casing 2A and an upper casing 2B that house a circuit board 3 equipped with a plurality of one-way terminals 10 that are attached to the circuit board 3. Terminals 10 have upper engagement features 11 that are engaged by the blade terminals 5a of the fuses 5 when the fuses 5 are plugged into the upper casing 2B. The circuit board 3 also carries electrical socket connectors (unnumbered) that are accessible via cut-out portions of the upper casing 2B. Plug-in connectors of wiring harness connectors (not shown) may be plugged into the electrical socket connectors that are carried on the printed circuit board 3 so that the insulated wires of the wiring harnesses form parts of the various electrical circuits that are partially formed on the circuit board 3.

It is also known to have a power distribution block, such as Delphi Power Distribution Block 13595105, that has a housing that is attached directly to the terminals at the ends of the insulated wires of a wiring harness without any intervening plug-in connector of the wiring harness. Fuses and relays are plugged into the housing to engage the terminals at the ends of the insulated wires of the wiring harness. However, the power distribution block does not include any splicing capability and is otherwise functionally limited due primarily to the absence of a circuit board that can handle several electrical devices and circuits.

SUMMARY OF THE INVENTION

The electrical center of the invention is adapted to be attached directly to the terminals at the ends of a wiring harness thereby eliminating the need for at least some plug-in connector bodies. The electrical center preferably includes a circuit board that has terminals that are connected directly to mating terminals at the ends of at least some of the electrical wires of a wiring harness so as to at least reduce the number of plug-in connectors that are needed for functional operation of the electrical center.

The electrical center of the invention comprises an upper housing in which a circuit board is disposed and that is attached to a mating lower housing that is carried by a wiring harness. The circuit board provides a substrate for electrical traces that may include splices for connecting various insulated wires of the wiring harness. The substrate may also serve as a mounting for on-board electronic devices as well. The circuit board carries a plurality of terminals including two-way pass-through terminals for connecting electrical devices that are plugged into the upper housing with terminals at the ends of the insulated wires of the wiring harness. The circuit board may also include plated holes or receptacles that enable terminals at the ends of insulated wires to plug directly into the circuit board.

BRIEF DESCRIPTION OF THE DRAWINGS

FIG. 3 is a longitudinal section of the electrical center shown in FIG. 1 with the housing shown in a prestaged condition for assembly to a wiring harness;

FIG. 4 is a longitudinal section of the electrical center shown in FIG. 1 with the housing shown in a fully assembled condition and the electrical center attached to the wiring harness;

DETAILED DESCRIPTION OF PREFERRED EMBODIMENTS

Figure 1:
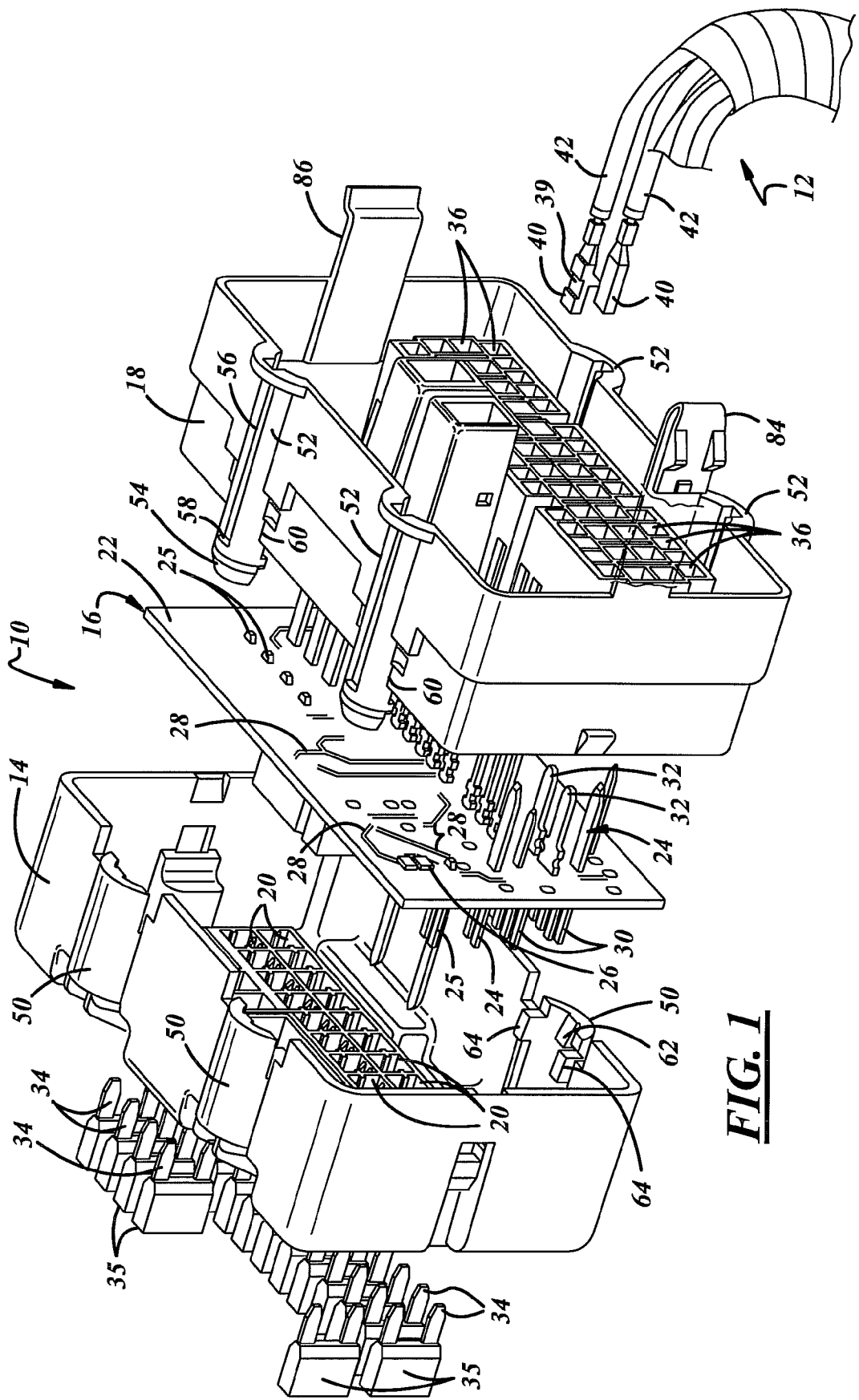
FIG. 1 is an exploded, perspective view of an electrical center embodying the invention.

Referring now to FIG. 1, an exploded, perspective view of an electrical center 10 mounted on a wiring harness 12 is illustrated. The electrical center 10 comprises an upper insulator housing 14, a circuit board assembly 16 and a lower insulator housing 18.

The upper insulator housing 14 has a plurality of upper terminal receiving cavities 20 that extend through the upper insulator housing 14. The circuit board assembly 16 comprises a circuit board 22 that is disposed in the in the upper housing 14 below the upper terminal receiving cavities 20. The circuit board assembly 16 further comprises a plurality of two-way, pass-through terminals 24, one-way terminals 25, one or more electrical or electronic devices 26 mounted on the circuit board 22, and a plurality of electrical traces 28 on the printed circuit board that may include terminal sockets 29, the electrical traces 28 serving to connect the terminals 24, 25 and the electrical or electronic devices 26 into various desired circuit patterns. The construction and function of circuit board assemblies, such as the circuit board assembly 16 are well known and need not be described in any further detail.

Regarding the circuit board assembly 16, the two-way pass-through terminals 24 have upper contact portions 30 above the circuit board 22 as well as lower contact portions 32 below the circuit board 22. Some of the one-way terminals 25 have upper contact portions 30 while others of the one-way terminals 25 have lower contact portions 32. The upper contact portions 30 are disposed in the upper terminal receiving cavities 20 for engaging mating terminals plugged into the upper terminal receiving cavities 20. For instance, the upper contact portions 30 may be a "tuning fork" design that receives mating blade terminals 34 that are plugged into upper terminal receiving cavities 30. The blade terminals 34 are commonly associated with fuses 35 that are plugged into electrical centers. However, other electrical devices, such as relays (not shown) are commonly plugged into electrical centers and consequently, one or more of the two-way pass-through terminals 24 and the one-way terminals 25 may have upper contact portions 30 of various designs to make with other types of terminals associated with relays or other electrical or electronic devices that may be plugged into an electrical center.

The lower insulator housing 18 also has a plurality of lower terminal receiving cavities 36 that extend through the lower insulator housing 18. The lower terminal receiving cavities 36 receive the lower contact portions 32 of the two-way pass-through terminals 24 and some of the one-way terminals 25 for engaging mating terminals 40 that are attached to wires 42 of the wiring harness 12 and that are plugged in the terminal receiving cavities 36 of the lower insulator housing 18. The lower contact portions 32 are illustrated as blades and the mating terminals 40 are illustrated as female terminals in the drawings. However, it should be understood that other types of lower contact portions and mating terminals may be used so long as the lower contact portions mate with the terminals attached to the wires 42 when the terminals are plugged into the terminal receiving cavities 36.

Figure 5:
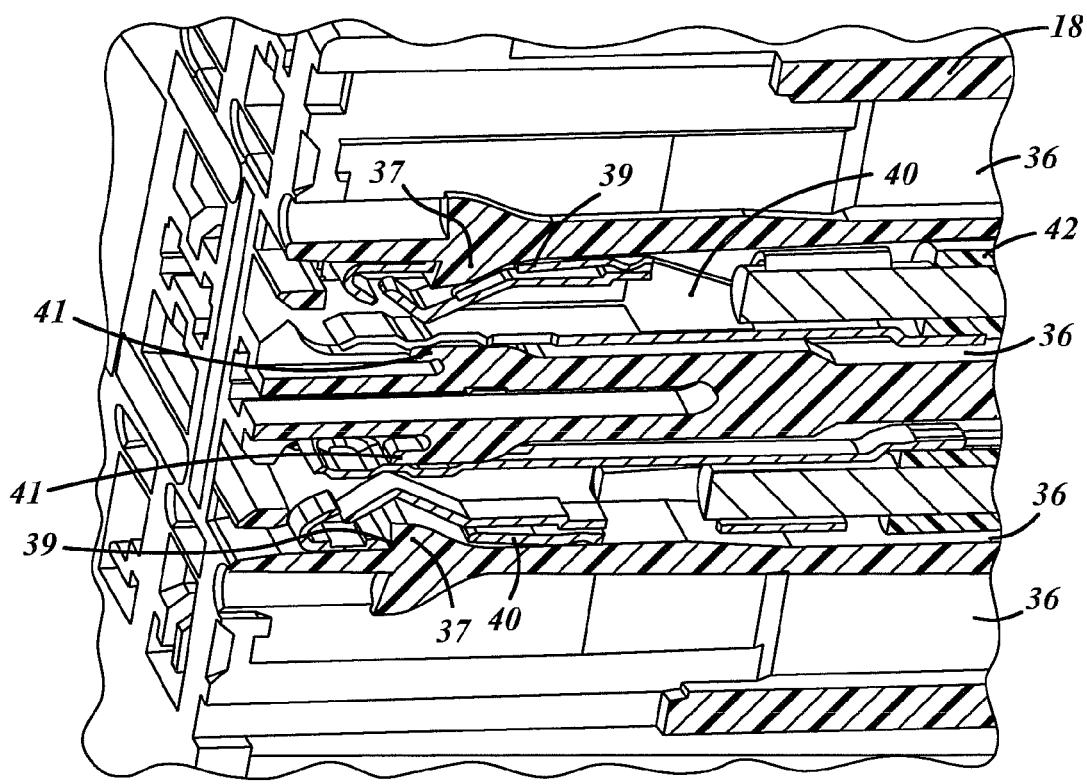
FIG. 5 is an enlargement of a portion of FIG. 3 showing details of a wiring harness terminal retained in a lower terminal receiving cavity of the lower housing.

With regard to the mating terminals 40 that are attached to wires 42 of the wiring harness 12, it is important that a sufficient number (and preferably all) of the mating terminals 40 are retained in the terminal cavities 36 so that the electrical center 10 is firmly attached to the wiring harness 12. FIG. 5 is an enlargement of a portion of FIG. 3 showing a typical terminal 40 retained in one of the terminal cavities 36. More specifically, terminal 40 is retained in terminal cavity 36 by a lock nib 37 that extends inwardly from a longitudinal wall of the terminal cavity 36 and engages in a recess 39 of the terminal 40. Terminal cavity 36 also includes a hold down member 41 that is attached to an opposite wall of the terminal cavity. The hold down member 41 engages an opposite side of the terminal 40 to hold terminal 40 down against the longitudinal wall in the terminal cavity 36 so that the lock nib 37 is kept in the recess 39 to retain the terminal 40 in the terminal cavity 36.

Further details of typical terminal retention arrangements are shown in U.S. Pat. No. 5,980,318 granted to John R. Morello et al. Nov. 9, 1999 and U.S. Pat. No. 7,048,584 granted to John R. Morello et al. May 23, 2006. However, it should be understood that other terminal retention arrangements may be used so long as a sufficient number (and preferably all) of the mating terminals 40 are retained in the terminal cavities 36 so that the electrical center 10 is firmly attached to the wiring harness 12.

The electrical center 10 may be preassembled with the upper and lower insulator housing parts prestaged for attachment to the wiring harness 12, that is before the mating terminals of the wiring harness 12 are inserted into the lower terminal receiving cavities 36. FIGS. 6-9 are fragmentary perspective views of the electrical center 10 showing the transition from an electrical center having a prestaged housing as shown in FIG. 3 to an electrical center having a fully assembled housing that is attached to a wiring harness as shown in FIG. 4.

Figure 6:
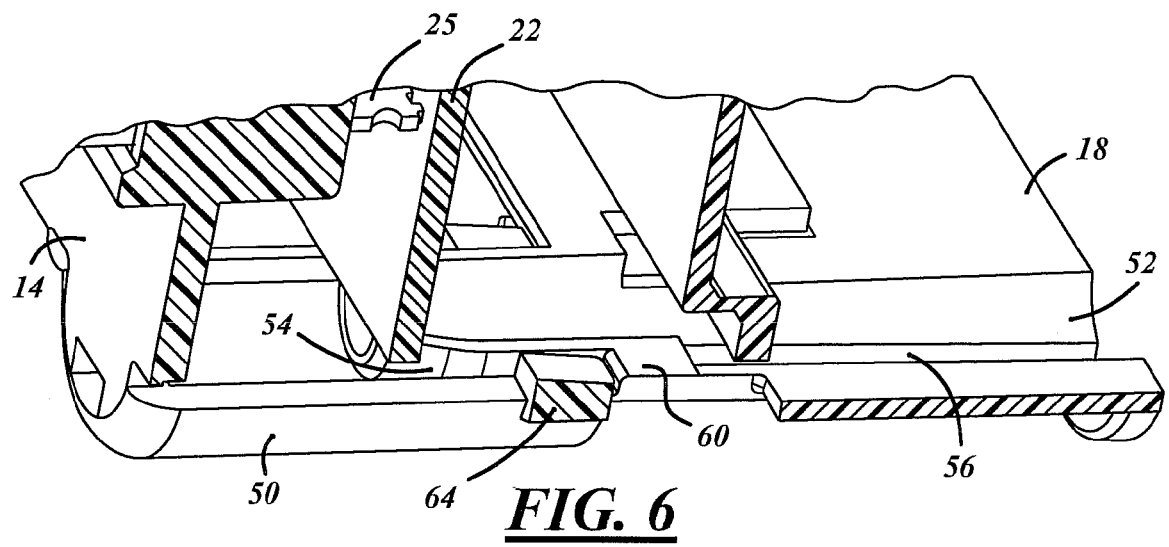
FIGS. 6-9 are fragmentary perspective views of the electrical center showing the transition from the prestaged condition of FIG. 3 to the fully assembled condition of FIG. 4.
Figure 7:
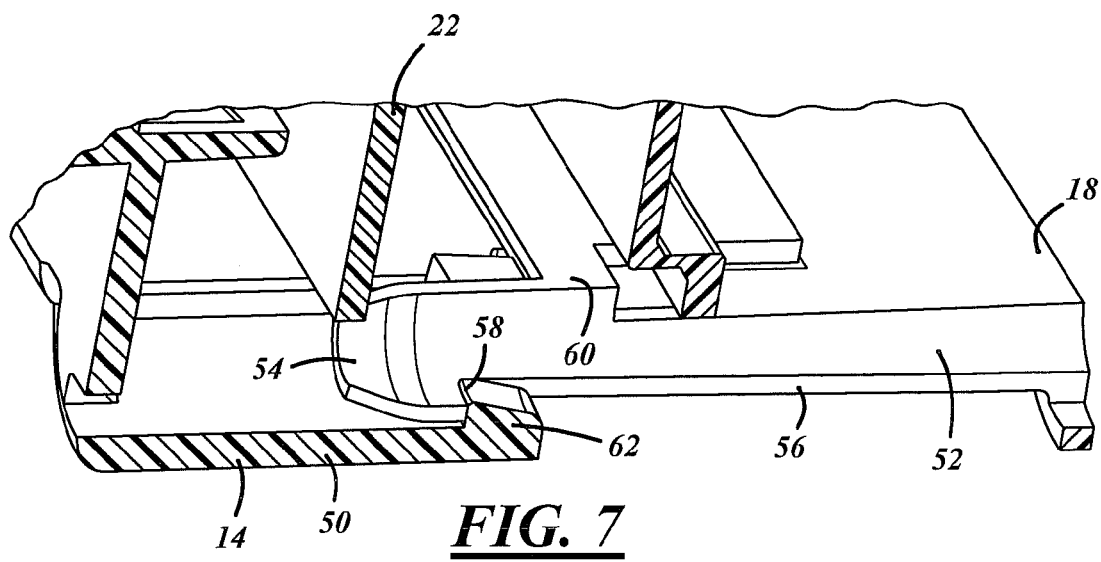

Referring to FIGS. 1, 6 and 7, it is seen that the upper insulator housing 14 has four guide channels 50 that receive four slotted lock studs 52 of the lower insulator housing 18 for retaining the upper and lower housings 14 and 18 in a prestaged condition and then guiding the upper and lower housings 14 and 18 into a fully assembled condition. The four guide channels 50 and four lock studs 52 provide a pre-stage lock. More specifically, each lock stud 52 has a tapered upper end 54, a longitudinal slot 56 that is closed at its upper end to provide an upper lock shoulder 58, and lower lock wings 60. Each guide channel 50 has an internal lock nib 62 and peripheral lock tabs 64 laterally spaced from the lock nib 62. During an initial assembly, the tapered upper ends 54 of the lock studs 52 are inserted into the guide channels 50 and pushed up into the guide channels 50 until the upper lock shoulders 58 snap past the internal lock nibs 62 (FIG. 7) and the lock wings 60 engage the lower ends of the peripheral lock tabs 64 (FIG. 6). Engagement of the lower ends of the peripheral lock tabs 64 prevents further insertion of the lock studs 52 into the guide channels 50. On the other hand, the lock nibs 62 engage the upper lock shoulders 58 to prevent withdrawal of the lock studs 52 so that the lower insulator housing 18 is held firmly in a prestaged condition with respect to the upper insulator housing 14 as shown in FIG. 8.

Figure 8:
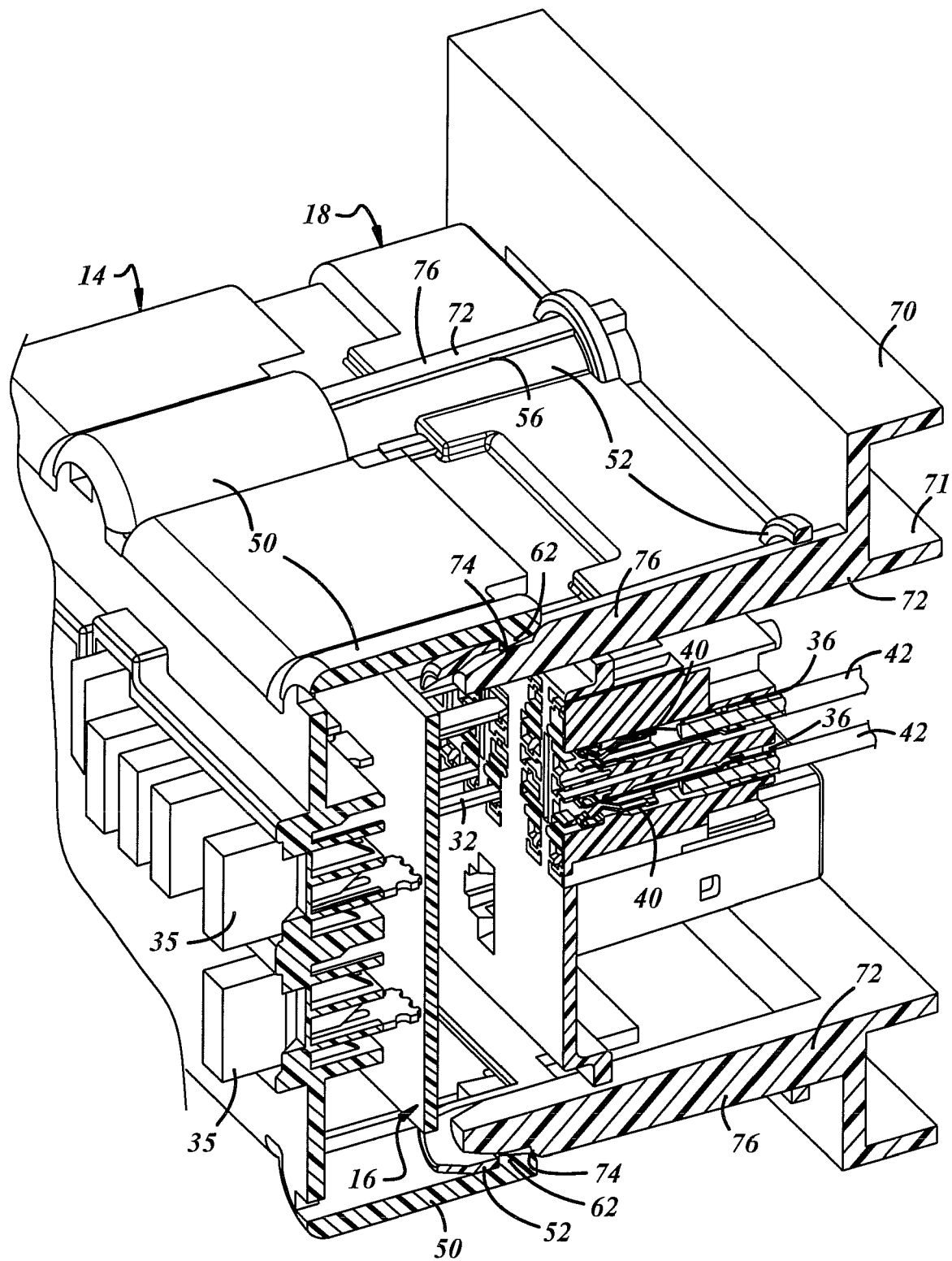

Referring now to FIG. 8, the prestaged upper and lower insulator housings 14, 16 are preferably adapted for use with a press holder 70 for completing assembly of the electrical center 10 and its attachment to the wiring harness 12. The press holder 70 has an annular base 71 that supports four upright fingers 72 that have cams 74 at their upper ends and lateral fins 76. Fingers 72 are inserted into the slotted lock studs 52 with the lateral fins 76 fitting into the longitudinal slots 56 and moved with respect to the lower insulator housing 18 until cams 74 contact the internal lock nibs 62 as shown in FIG. 8. Wiring harness terminals 40 are then inserted into the lower terminal receiving cavities 36 and until a sufficient number of the wiring harness terminals 40 are retained therein as shown in FIGS. 3, 5 and 8 so that the lower insulator housing 18 is attached firmly to the wiring harness 12. It should be noted that the wiring harness terminals 40 do not have any substantial engagement with the lower contact portions 32 of the terminals 24, 25 carried by the circuit board 22 when the wiring harness terminals 40 are loaded into the lower terminal receiving cavities 36 so that any significant terminal-to-terminal engagement force is avoided during the terminal loading process. With this feature, the electric wires 42 can have a reduced gauge since only the terminal insertion force is encountered.

Figure 2:
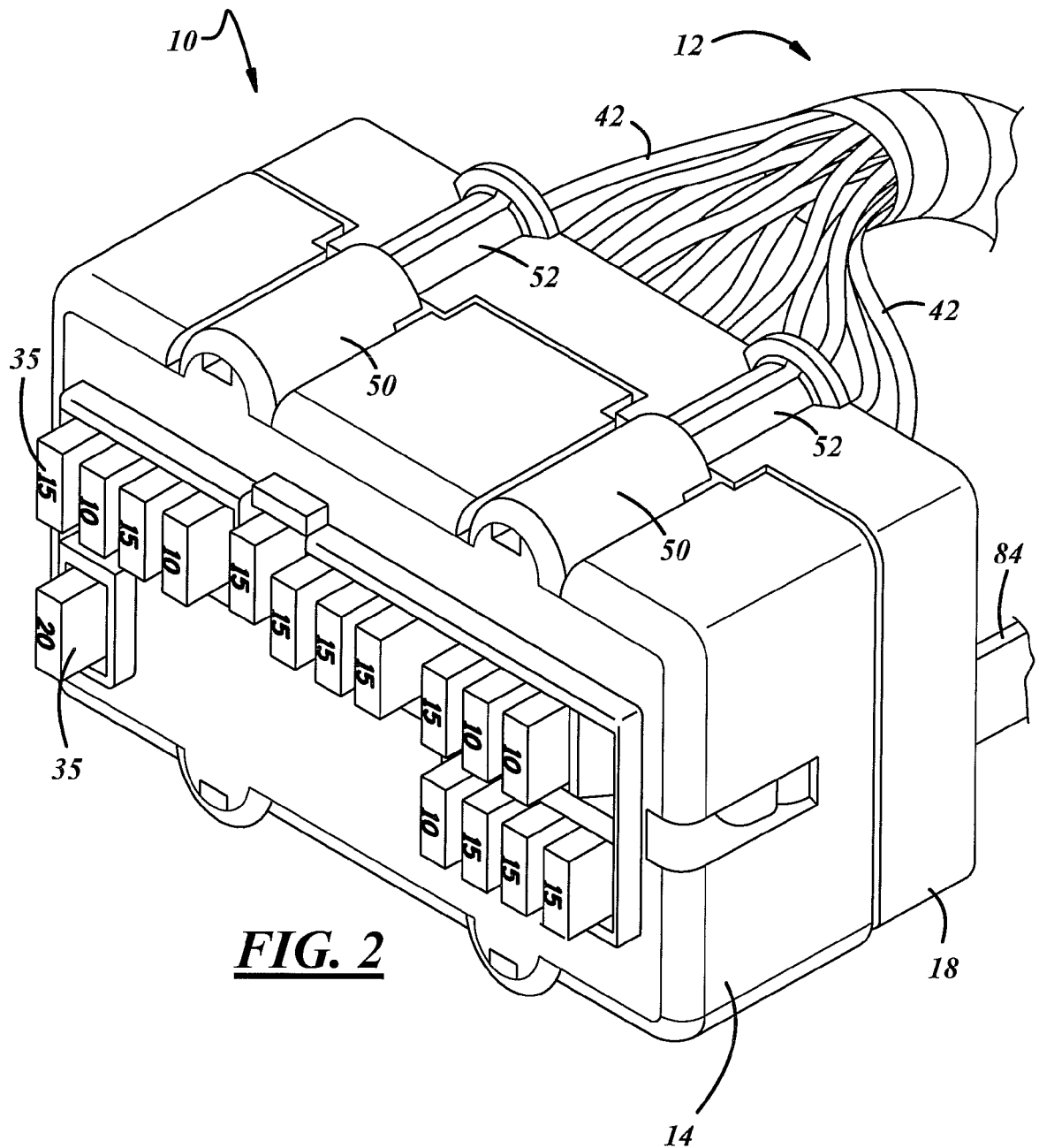
FIG. 2 is a perspective view of the electrical center shown in FIG. 1.
Figure 10:
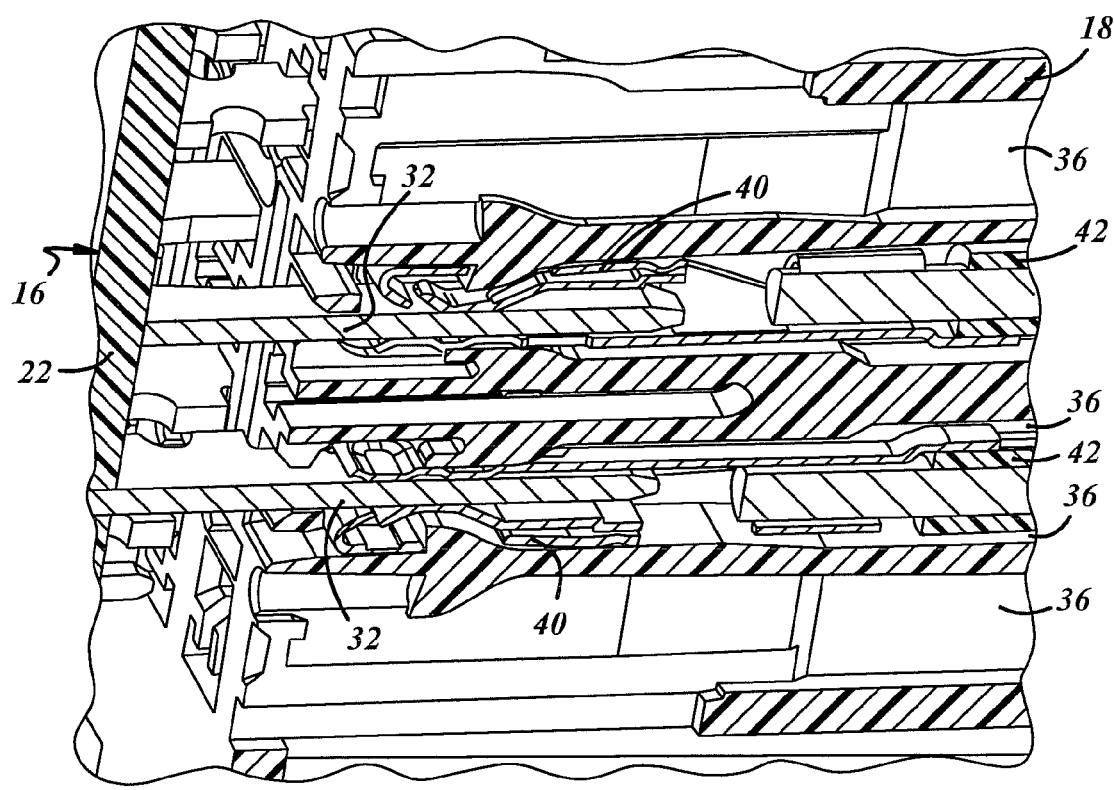
FIG. 10 is an enlargement of a portion of FIG. 9 showing details of the engagement of a wiring harness terminal and a circuit board terminal.
Figure 9:
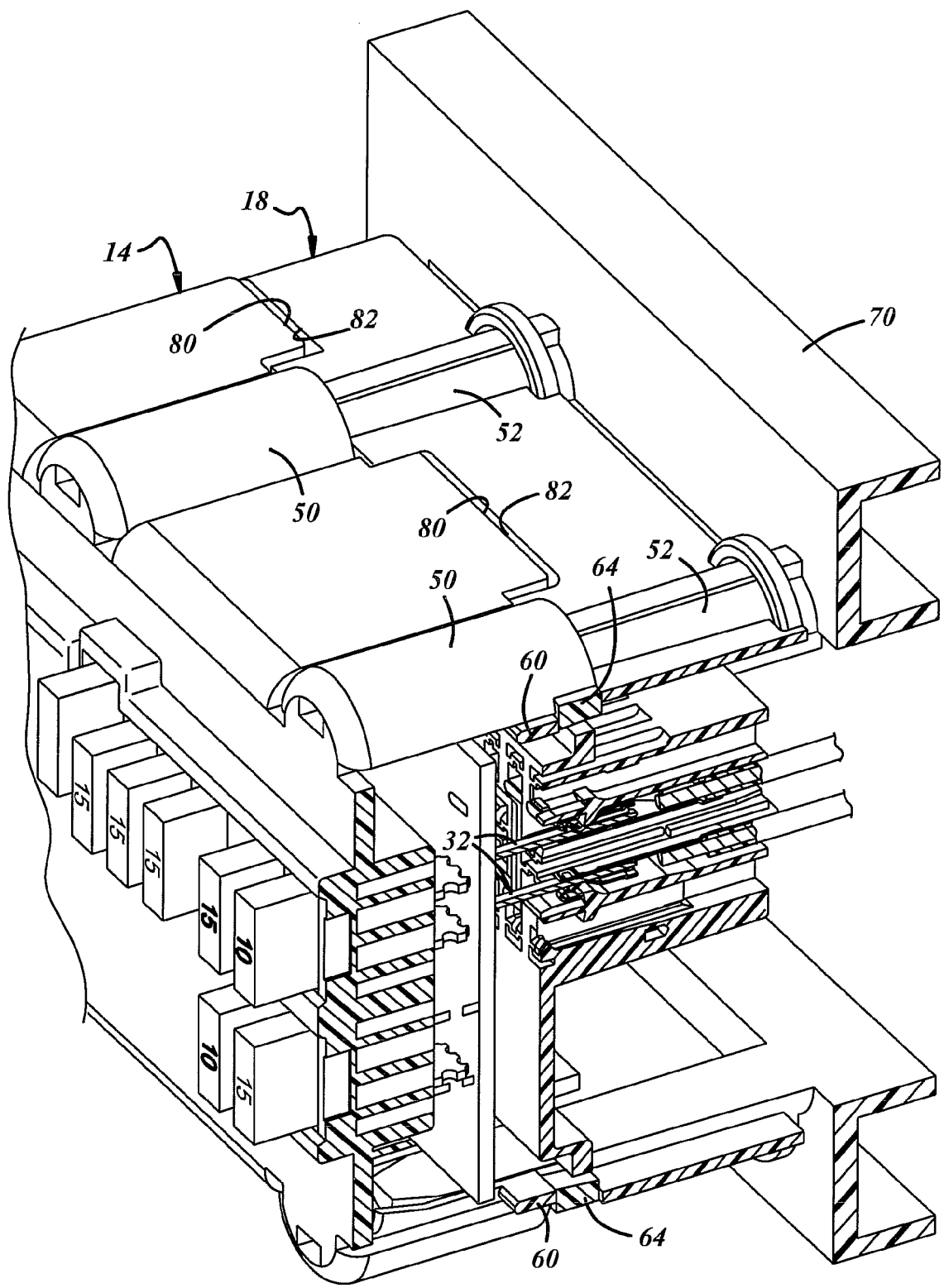

After all the wiring harness terminals 40 are loaded in the lower insulator housing 18, the upper insulator housing 14 is pushed down to fully seat on the lower insulator housing 18, that is, toward the right as shown in FIG. 8. As the upper insulator housing 18 is pushed down the lower ends of the guide channels 50 are pushed outwardly by the cams 74 at the upper ends of the upright fingers 72 of the press holder 70 pushing against the internal lock nibs 62. Pushing the lower ends of the guide channels 50 and the lock tabs 64 attached outwardly releases the lock wings 60 and allows the lock studs 52 to move up into the guide channels 50 until cooperating external faces 80 and 82 of the upper and lower housings 14 and 18 engage as shown in FIGS. 2, 4 and 9. The upper insulator housing 14 is retained in the fully seated condition with the lower insulator housing 18 by the lock wings 60 of the lock studs 52 engaging the upper ends of the lock tabs 64 of the guide channels 50 as best shown in FIG. 9. When the upper insulator housing 14 is pushed down onto the lower insulator housing 18, the lower contact portions 32 of circuit board terminals 24, 25 engage the wiring harness terminals 40 as shown in FIGS. 4 and 10. The press holder 10 is then simply removed and the wiring harness 12 with the fully assembled electrical center 10 firmly attached to it as shown in FIG. 2 is shipped to another factory or department for assembly into an automobile.

When the wiring harness 12, is assembled into the automobile, the electrical center 10 is preferably attached to a support panel of the automobile. To this end the lower housing 18 preferably includes a panel mounting feature such as the panel lock arms 84 and 86 that are shown in FIGS. 1 and 2.

To those skilled in the art to which this invention pertains, the above described preferred embodiment may be subject to change or modification. Such change or modification can be carried out without departing from the scope of the invention, which is intended to be limited only by the scope of the appended claims.

We claim:

1. An electrical center for mounting on a wiring harness comprising:
    an upper housing having a plurality of upper terminal receiving cavities,
    a circuit board disposed in the upper housing below the upper terminal receiving cavities,
    a plurality of terminals mounted on the circuit board having contact portions above the circuit board disposed in the upper terminal receiving cavities for engaging mating terminals plugged into the upper terminal receiving cavities, and
    a lower housing having a plurality of lower terminal receiving cavities,
    the plurality of terminals having contact portions below the circuit board disposed in the lower terminal receiving cavities for engaging mating terminals that are attached to receiving cavities, wherein the upper housing has a plurality of guide channels and the lower housing has a plurality of lock studs that are received in the guide channels and wherein the have the plurality of guide channels and the plurality of lock studs have means to retain the upper housing and the lower housing in a prestaged condition to facilitate loading of the mating terminals that are attached to the wires of the wiring harness and that are plugged in the lower terminal receiving cavities.

2. The electrical center as defined in claim 1 wherein the mating terminals that are attached to the wires of the wiring harness are retaining in the lower terminal receiving cavities so that the electrical center is firmly attached to the wiring harness.

3. The electrical center as defined in claim 2 wherein the plurality of terminals that are mounted on the circuit board includes two-way pass-through terminals having contact portions below the circuit board and contact portions above the circuit board.

4. The electrical center as defined in claim 3 wherein the plurality of terminals that are mounted on the circuit board includes on-way terminals that have either a contact portion above the circuit board or a contact portion below the circuit board.

5. The electrical center as defined in claim 4 wherein the upper housing and the lower housing have means to retain the upper housing and the lower housing in a prestaged condition to facilitate loading of the mating terminals that are attached to the wires of the wiring harness and that are plugged in the lower terminal receiving cavities.

6. The electrical center as defined in claim 1 wherein the means to retain the upper housing and the lower housing in a prestaged condition to facilitate loading of the mating terminals that are attached to the wires of the wiring harness and that are plugged in the lower terminal receiving cavities includes an internal lock nib and lock tabs of the guide channels and lock shoulders and lock wings of the lock studs.

7. The electrical center as defined in claim 6 wherein the lock tabs of the guide channels are located at flexible ends of the guide channels that can be deflected outwardly to allow passage of the lock wings so that the upper housing may be fully seated on the lower housing.

8. The electrical center as defined in claim 7 wherein the lock wings engage a lower end of the lock tabs to retain the upper housing in a prestaged condition and engage an upper end of the lock tabs to retain the upper housing in a fully seated condition.

9. The electrical center as defined in claim 7 wherein the lock studs of the lower housing receive fingers of a press holder when the upper housing is in a prestaged condition that engage the lower ends of the guide channels to deflect the lower ends of the guide channels outwardly when the upper housing is pushed down on the lower housing to allow passage of the lock wings past the lock tabs so that the upper housing can be fully seated on the lower housing.

10. The electrical center as defined in claim 5 wherein the upper housing and the lower housing are adapted to cooperate with a press holder to move from the prestaged condition to the fully seated condition.

* * * * *